US008562329B2

(12) United States Patent
Moslehi et al.

(10) Patent No.: US 8,562,329 B2
(45) Date of Patent: Oct. 22, 2013

(54) EMBOSSING TOOL AND EMBOSSED PRODUCT

(75) Inventors: Manoochehr Moslehi, Göteborg (SE); Solgun Drevik, Mölnlycke (SE)

(73) Assignee: SCA Hygiene Products AB, Göteborg (SE)

( * ) Notice: Subject to any disclaimer, the term of this patent is extended or adjusted under 35 U.S.C. 154(b) by 0 days.

(21) Appl. No.: 13/635,920

(22) PCT Filed: Jun. 21, 2010

(86) PCT No.: PCT/EP2010/058708
§ 371 (c)(1),
(2), (4) Date: Sep. 19, 2012

(87) PCT Pub. No.: WO2011/160669
PCT Pub. Date: Dec. 29, 2011

(65) Prior Publication Data
US 2013/0011512 A1 Jan. 10, 2013

(51) Int. Cl.
*B29C 59/04* (2006.01)

(52) U.S. Cl.
USPC ........... 425/367; 425/168; 425/171; 425/193; 425/194; 425/385

(58) Field of Classification Search
USPC .................. 425/193, 194, 385, 168, 171, 367
See application file for complete search history.

(56) References Cited

U.S. PATENT DOCUMENTS 1,357,141 A * 10/1920 Bibb .............................. 425/194
2,542,377 A * 2/1951 Turkish .......................... 411/334

(Continued)

FOREIGN PATENT DOCUMENTS

EP 1321286 A1 6/2003
WO WO 03/008183 A1 1/2003

OTHER PUBLICATIONS

International Search Report (PCT/ISA/210) issued on Mar. 4, 2011, by the European Patent Office as the International Searching Authority for International Application No. PCT/EP2010/058708.

(Continued)

*Primary Examiner* — Timothy Kennedy
(74) *Attorney, Agent, or Firm* — Buchanan Ingersoll & Rooney PC

(57) ABSTRACT

An embossing tool includes a rotary embossing roll (10) with an axis of rotation (16) in its longitudinal direction and raised embossing protrusions (18; 18*a*, 18*b*) arranged on the operative surface area (12) of the embossing roll (10). The embossing roll (10) includes a least two segments (14; 14*a*-14*h*) forming at least a part of the operative surface area (12) of the embossing roll (10). Each segment (14; 14*a*-14*h*) is provided with at least one raised embossing protrusion (18; 18*a*, 18*b*) and the radial position and angular orientation of at least one segment (14; 14*a*-14*h*) is adjustable by at least two spaced apart, independently provided adjustment devices (26).

14 Claims, 4 Drawing Sheets

(56) References Cited

U.S. PATENT DOCUMENTS

| | | | | |
|---|---|---|---|---|
| 3,759,173 | A * | 9/1973 | Jullien-Davin | 101/66 |
| 4,211,743 | A * | 7/1980 | Nauta et al. | 425/385 |
| 4,334,473 | A * | 6/1982 | Becker et al. | 101/409 |
| 4,411,194 | A * | 10/1983 | Davidson, Jr. | 101/216 |
| 5,161,465 | A * | 11/1992 | Lewis et al. | 101/467 |
| 5,372,494 | A * | 12/1994 | Vaughan | 425/194 |
| 5,759,455 | A * | 6/1998 | Kamitakahara et al. | 425/363 |
| 6,170,393 | B1 * | 1/2001 | Hook et al. | 101/6 |
| 6,998,086 | B2 | 2/2006 | Lake et al. | |
| 2002/0144580 | A1 * | 10/2002 | Aichele | 83/346 |
| 2002/0197346 | A1 * | 12/2002 | Papadopoulos | 425/194 |
| 2005/0064058 | A1 | 3/2005 | Lake et al. | |

OTHER PUBLICATIONS

Written Opinion (PCT/ISA/237) issued on Mar. 4, 2011, by the European Patent Office as the International Searching Authority for International Application No. PCT/EP2010/058708.

Written Opinion (PCT/IPEA/408) issued on May 31, 2012, by the European Patent Office as the International Examining Authority for International Application No. PCT/EP2010/058708.

* cited by examiner

EMBOSSING TOOL AND EMBOSSED PRODUCT

FIELD OF THE INVENTION

The invention relates to an embossing tool with the features of the pre-characterising part of claim 1. Further, the invention relates to an embossed product with the features of the pre-characterising part of claim 10.

PRIOR ART

The embossing on three dimensional products is difficult, especially products like tissue products or fluff products. Such products have a core which can be provided with a continuously end/or stepwise changing height. In such a case it might be desirable to provide such a profiled core with embossed continuous grooves or channels which are embossed into the profiled core.

Another problem arises if the density of the core changes continuously or stepwise. Also in this case, it is difficult to provide embossed depressions in the product because the depth of embossing largely depends on the local density of the product. Products with a non-uniform depth of embossing have a negative effect on the desired visibility of an embossing pattern.

Besides the aesthetic appearance of a product, the function of embossed depressions is of crucial interest. Especially, when drain depressions are provided, it is important that they perform the desired function to move moisture or liquids to be discharged with high speed and unimpededly to a target zone of the product. In such a case it might also be desirable to design embossed depressions which vary with regard to their widths or depths over the length of the embossed depression. Such specific design of embossed grooves might also be desirable in case of homogeneous pulp-core products which have an even thickness and density.

U.S. Pat. No. 6,998,086 describes a rotary embossing roll with segments. These segments can be arranged at a different radial position of the roll using spacers of varying thicknesses. A similar solution is disclosed in EP 1 321 286 B1 which also follows the same principle, namely to adjust the radial position of regions on the embossing surface of a rotary embossing roll.

The same effect as described in U.S. Pat. No. 6,998,086 and EP 1 321 286 B1 can be achieved by modifying the anvil roll instead of the embossing roll. Such a technology is described in WO 03/008183 A1. The anvil roll running in register with the embossing roll is modified to have discrete zones on its peripheral surface with different characteristics of the yielding layer. Such different characteristics can be a different material composition or a surface treatment compared to the yielding layer of the remaining part of peripheral surface. The yielding layer of the anvil roll can also be thicker in specific zones. These different measures serve to influence the depth of embossing when such anvil roll cooperates and runs in synchronicity with an embossing roll.

SUMMARY OF THE INVENTION

It is the object of the invention to provide an embossing tool which allows for a high variability of embossed depressions of a pulp-core product, even in case it has an inhomogeneous core.

This object is solved by an embossing tool with the features of claim 1. The embossed product is described by the features of claim 10. Advantageous embodiments follow from the other claims.

According to the invention, the embossing tool comprises a rotary embossing roll with an axis of rotation in its longitudinal direction and raised embossing protrusions arranged on the operative surface area of the embossing roll. The embossing roll comprises at least two segments forming at least a part of the operative surface area of the embossing roll, each segment being provided with at least one raised embossing protrusion. The embossing tool is characterized in that the radial position and angular orientation of at least one segment is adjustable by means of at least two spaced apart, independently provided adjustment devices.

The advantages of such an embossing tool are its high variability. Using only one basic cylinder of the embossing roll, it is easy to adjust such embossing roll to the specific shape of a profiled core as well as to the desired shape of embossed grooves. Due to the possibility to adjust the angular orientation of a segment, the occurrence of steps in the bottom of embossed grooves extending over the bounds of two adjacent segments can be avoided. This has the advantage that moisture or liquids to be discharged are not trapped at such a step in the bottom of an embossed groove but can be moved efficiently to the target zone of the product.

Accordingly, the embossed product which is especially a tissue product or fluff product comprises embossed depressions in the product. Along at least one longitudinal depression the surface weight of the material surrounding the depression continuously and/or stepwise increases or decreases. The embossed product is characterized in that at least along one depression the density of the depression is essentially constant. Such a product is provided with a distinct pattern in the core which improves the aesthetic appearance of a product, the core of which is non-uniform. If the surface weight of the material surrounding the depression decreases or increases along its longitudinal extension, it is possible to control the spreading of liquid along the channels of the product. It is also possible to create a shape in the core of the product by providing a core with a plurality of depressions with a slowly increasing or decreasing density along one or a plurality of these depressions.

According to a preferred embodiment of the invention, the embossing tool is characterized in that at least two segments are positioned next to each other in the longitudinal direction of the embossing roll. According to another or additional preferred embodiment, at least two segments are positioned next to each other in a circumferential direction of the embossing roll. Therefore, it is possible to design the embossing roll in any suitable way such that segments positioned next to each other are arranged in a longitudinal direction and/or circumferential direction of the embossing roll. In view of the fact that the radial position and angular orientation of each segment is individually adjustable, this gives a nearly unlimited number of different variations how adjacent segments in a longitudinal direction or circumferential direction of the rotary embossing roll are arranged. The high variability as regards the position and orientation of the individual segments makes it possible to emboss the products in a controlled and predetermined way to get the desired product characteristics. When embossing yielding material like tissue products or fluff products, it is very difficult to predict the final embossing pattern in detail, especially when non-uniform core profiles have been embossed. In such a case, the provision of the at least two spaced apart, independently provided adjustment devices for each segment makes it possible to easily re-adjust the proper position and orientation of each segment during the test phase of the product.

According to a preferred embodiment, the embossing tool further comprises a fixing means for fixing the segments to a core element of the embossing roll. In principle, it would be sufficient to design the at least two spaced apart, independently provided adjustment device such as to have the double function of adjusting the radial position and angular orientation of the at least one segment and, at the same time, to fix such segment to a core element of the embossing roll. However, it is more convenient to separate these two functions. Once the adjustment of the position of the segment has been finalized, the segment is finally fixed in such position and, without loosening the fixing means, the position of the segment cannot be changed.

Preferably, the adjustment devices are screws, preferably self-locking screws. This is an extremely easy way to provide the proper adjustment of segments on a core element of the embossing roll. When using self-locking screws, the screws have only to be brought in a proper position before the segments are fixed in such position by using a separate fixing means. However, screws could also be used as a single means for both adjusting the position and fixing the segments to a core element.

According to a preferred embodiment, the adjustment devices provide for a maximum variation in the radial extension of 0.8 mm, preferably 0.5 mm. This is a reasonable range for commercial tissue or fluff products with a profiled core.

Preferably, the angular tilting of a segment relative to the longitudinal direction and/or circumferential direction does not exceed 45 degrees. The angular tilting depends on the size of a segment and on the variation in the radial extension of a segment. At any rate, relatively complex shapes of profiled cores might be accounted for if relatively small segments are used.

According to a preferred embodiment of the invention, at least one of the embossing protrusions of a segment has a gradually or stepwise varying thickness and/or height. The individual segments should not be too small. However, there might be cases in which a profiled core has high local variations in its topography. It is also possible that embossed depressions are positioned close to each other but have a very different function so that different requirements with regard to their geometry and the density of the surrounding material exist. In such a case, it might be difficult to subdivide the operative surface area of the embossing roll into too many small segments. Instead, the embossing protrusions on a segment might be adjusted to serve special needs in order to give all possible options with regard to the geometry of embossed depressions and the material characteristics of the core material surrounding such depressions.

Preferably, the embossing tool further comprises an anvil roll cooperating with the embossing roll, the operative surface of the anvil roll being covered with the yielding material.

The core of the product can consist of several sheets of material on top each other, either with the same size or different sizes to create a three dimensional core. The different materials are for example airlaid sheet, nonwoven, foam and tissue. The core of the product is suitable for many different applications like sanitary napkins, baby diapers and female and male incontinent products.

BRIEF DESCRIPTION OF THE DRAWINGS

In the following, the invention will be briefly discussed with reference to the drawings in which.

DESCRIPTION OF PREFERRED EMBODIMENTS

Figure 1:
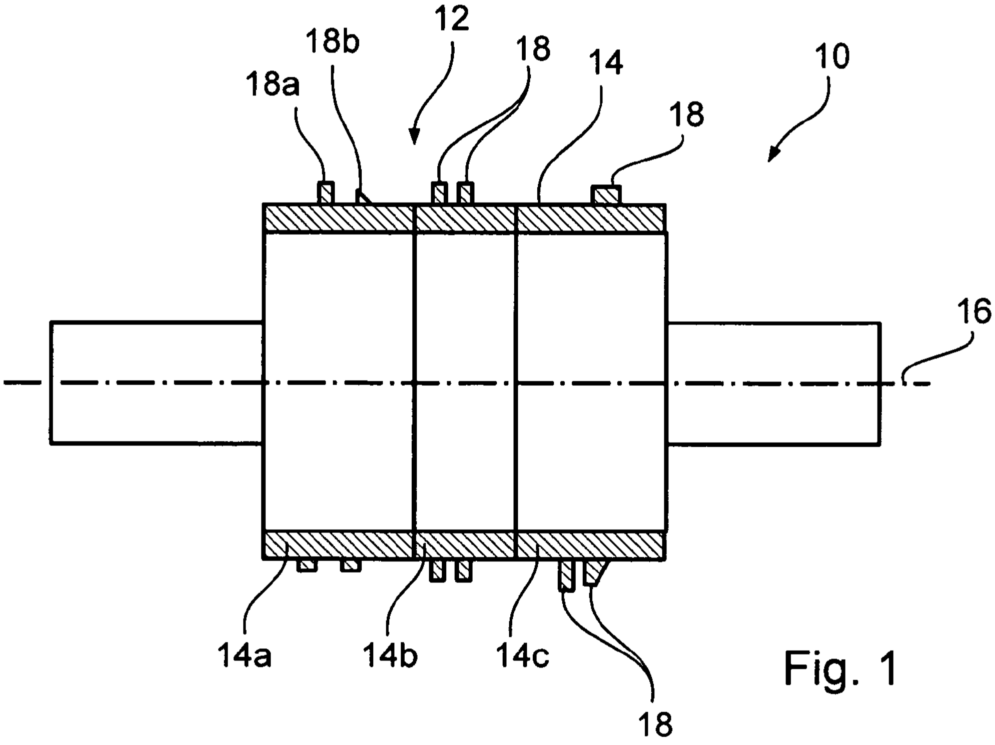
FIG. 1 schematically shows an embossing roll with various segments forming its circumferential operative surface area as well as schematically shown embossing protrusions on the operative surface area of the segments.

In the following drawings, the same or similar elements are represented by the same reference numerals.

FIG. 1 schematically shows the inventive embossing tool which is an embossing roll generally denoted by reference numeral 10. The embossing roll is except for the segments provided on its operative surface area of a conventional type. The operative surface area 12 of the embossing roll 10 is provided with individual segments 14. It is not necessary that the whole operative surface area of the embossing roll is provided with individual segments. Depending on the product to be embossed it might be sufficient to provide only one or two segments 14 which have to have a specific positional adjustment as described below. In the example as shown in FIG. 1, it can be seen that several segments 14*a*, 14*b* and 14*c* are arranged in the longitudinal direction of the embossing roll which is parallel to the rotational axis 16 of the embossing roll. Likewise, any technically feasible number of segments can also be arranged in a circumferential direction of the embossing roll 10, which can later be seen from FIG. 2.

FIG. 1 schematically shows various embossing protrusions 18 which project from the circumferential surface area of each segment 14, 14*a*, 14*b*, 14*c*. What FIG. 1 also schematically shows is that the shape of the embossing protrusions 18 can be different as e.g. exemplified by embossing protrusions 18*a* and 18*b*. "Different shape" means that any of the basic geometrical dimensions like height, width and shape can be different. It also means that the embossing protrusions 18 which are only shown in a cross-sectional view in FIG. 1 might vary along their longitudinal extension.

Figure 2:
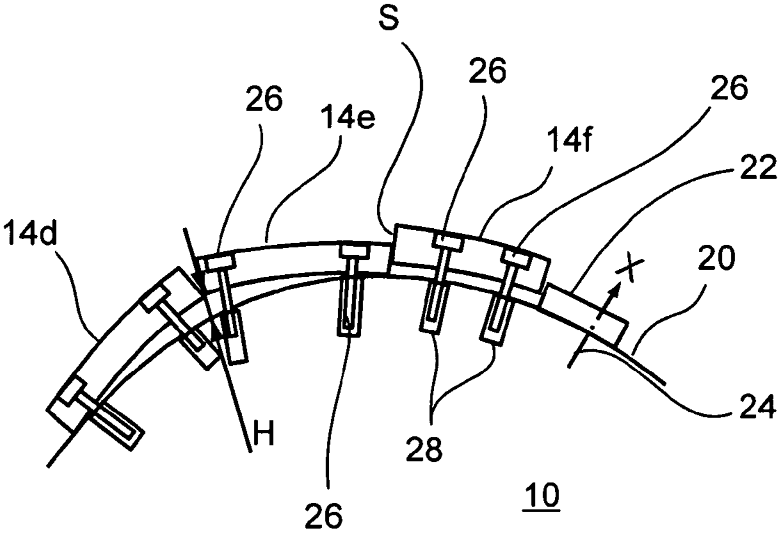
FIG. 2 schematically shows three segments attached to the core of a rotary embossing roll and the independently provided adjustment devices.

FIG. 2 schematically shows a part of an embossing roll consisting of a core 20 of the embossing roll and segments 14*d*, 14*e* and 14*f* attached to the core of the embossing roll. The dimensions in the schematic drawing of FIG. 2 are highly exaggerated and, for practical purposes, the maximum variation H in the radial extension should be in the range of 0.5 mm, preferably 0.4 mm. However, in order to more clearly show the radial and angular positioning of individual segments 14*d*, 14*e*, 14*f*, a representation with clearly visible dimensions was chosen. As can be seen from FIG. 2, there are several options. Segment 14*f* is positioned such that the radial position is changed. In other words, the operative surface area of segment 14*f* is simply raised relative to e.g. a fixed element 22 of the embossing roll which is simply fixed by means of a suitable fixing means 24 but which cannot be adjusted in its radial position and/or angular orientation. Segment 14*f* is provided with adjustment devices which, in the specific embodiment as shown in FIG. 2, are adjustment screws 26 threaded into correspondingly arranged thread holes 28 in the core of embossing roll 10.

Adjacent to segment 14*f* is segment 14*e* which forms a step S relative to segment 14*f*. Such defined step between segments can be provided if the product to be embossed has a core profile which is stepped in the corresponding position.

Segment 14*e* is also provided with adjustment screws which, however, are adjusted such that segment 14*e* is angularly oriented relative to the circumferential surface of the core 20 of the embossing roll 10. To this end, the adjustment screws individually engage the thread holed such as to achieve the angular orientation in the circumferential direction. The same basic principle applies when an adjustment has to be made in the longitudinal direction of the embossing roll which is perpendicular to the plane of FIG. 2. Any desired combination of angular orientations in both the longitudinal and circumferential direction is possible when using more than two individual adjustment devices.

Next to segment 14*e* is segment 14*d* which is also angularly orientated relative to the circumferential surface of the core but positioned such that there is a smooth transition between segments 14*e* and 14*b*, i.e. no radial difference of the adjacent edges of segments 14*e* and 14*d*. Due to the exaggerated dimensions shown in FIG. 2, there is a considerable gap formed between segments 14*d* and 14*e*. However, it should be kept in mind that the maximum radial adjustment height H does not exceed 0.5 mm which is relatively small in comparison to the relatively large dimensions of conventional embossing rolls.

Although in FIG. 2 segments 14*d* and 14*e* are only angularly adjusted so that one side of each segment abuts the core 20 and only the other side of these segments is lifted up, any desirable combination of a radial positioning as exemplified by segment 14*f* and angular positioning as exemplified by segments 14*e* and 14*d* can be realized.

FIG. 2 does not show embossing protrusions on the operative surface area of the individual segments. However, each segment is provided with at least one raised embossing protrusion which is exemplified in FIG. 3 which is a development of a part of the operative surface area of an embossing roll. In FIG. 3 embossing protrusions 18 are shown. There are three distinct elements carrying the overall embossing pattern. These are segments 14*g* and 14*h* and a fixed element 22 inbetween. The fixed element is provided with through holes 30 for suitable fixing means (not shown in FIG. 3) which can be conventional screws. Segments 14*g* and 14*h* are additionally provided with a plurality of adjustment devices 26 which serve to provide any suitable radial position and/or angular orientation of the segments when fixed to the core of an embossing roll.

Figure 4:
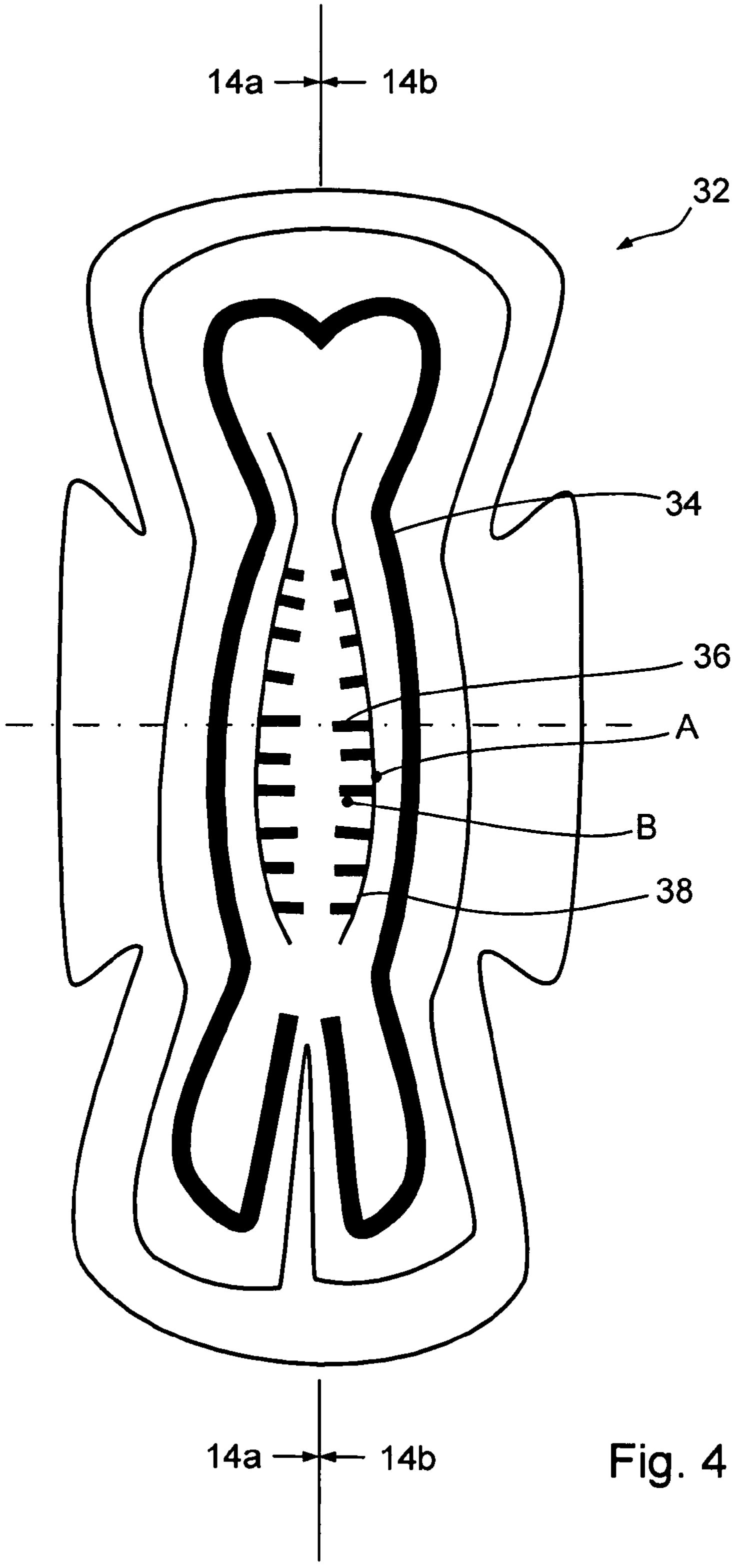
FIG. 4 shows a first inventive product, in the specific example a sanitary napkin with embossed grooves and additionally shows where individual segments of the embossing tool were provided.
Figure 5:
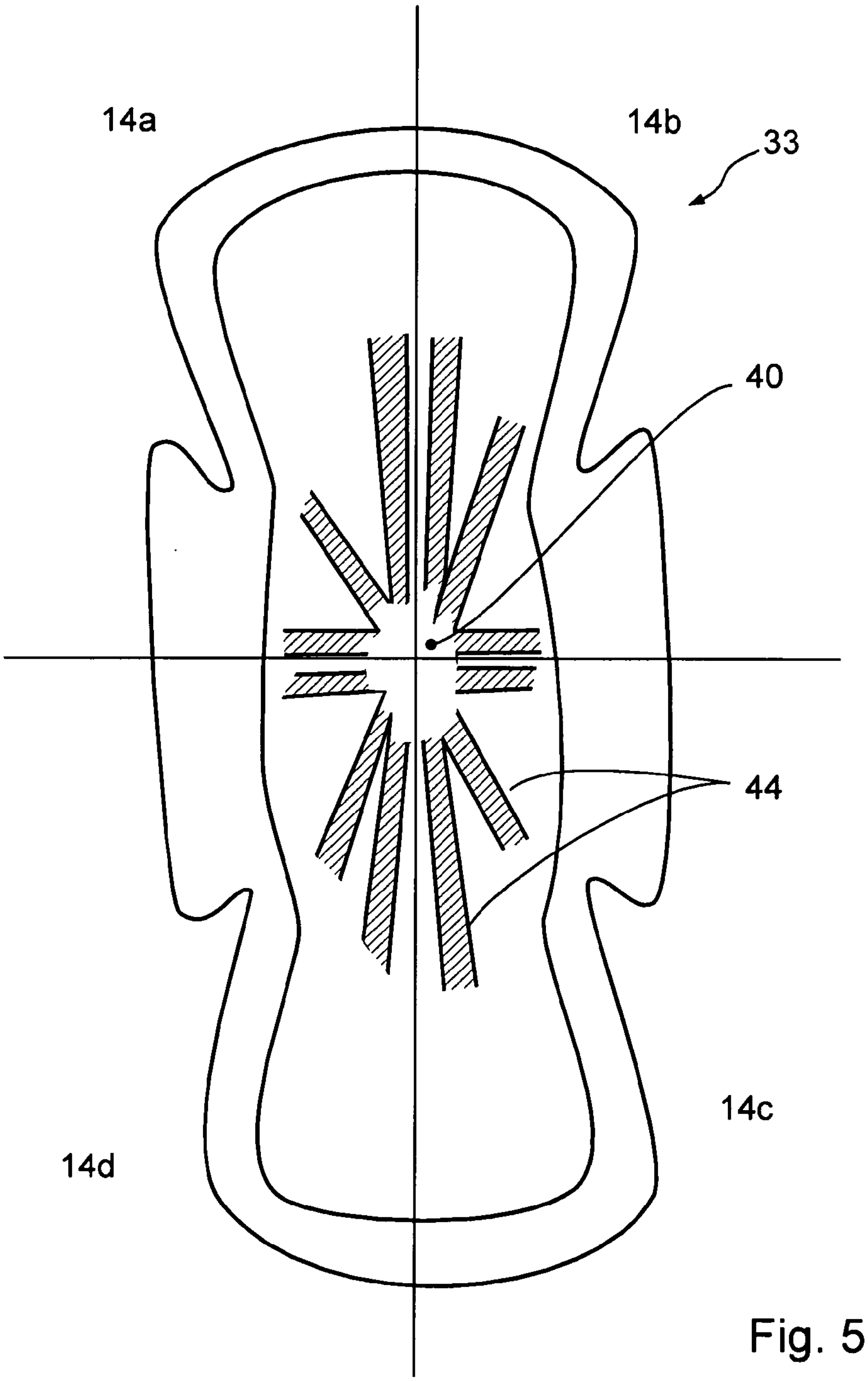
FIG. 5 shows a further inventive product, in the specific example a sanitary napkin with embossed grooves and additionally shows where individual segments of the embossing tool were provided.

FIGS. 4 and 5 give an example of a pulp-core product exemplified by a sanitary napkin 32. Like many of the feminine care absorbent products, sanitary napkin 33 can include a liquid pervious top sheet, a substantially liquid impervious backsheet joined to the top sheet and an absorbent core positioned and held between the top sheet and the back sheet. The top sheet is operatively permeable to the liquids that are intended to be held or absorbed by the absorbent article. By means of an embossing tool as described above, differently shaped embossing grooves are generated in the top side of the core of the product. Such grooves are depressions which are formed by the embossing protrusions arranged on both fixed elements and segments forming the operative surface area of the embossing roll. From FIG. 4 it can be seen that groove 34 can have a different width and that there are further grooves 36 having a smaller width. In order to direct liquid away from the middle of product 32 into grooves 38, small further grooves 36 are provided which should have a specific profile. The depths of grooves 36 at position A close to groove 38 should be higher than at position B remote from groove 38.

When using an homogeneous product with an even thickness of the pulp core, such gradually increasing depth from point B to point A of grooves 36 can be realized by providing two segments 14*a* and 14*b* not forming part of the product 32 according to FIG. 4 but shown in this drawing to demonstrate the mutual position of two segments 14*a*, 14*b* abutting each other along the longitudinal axis (centerline) of product 32. Segments 14*a* and 14*b* can be adjusted such that they are angularly oriented. This leads to an embossing pressure which is less near the longitudinal center line of product 32 compared to a position laterally spaced from the longitudinal axis. As a result of this, not only the increasing depths of grooves 36 from their end remote from groove 38 to their end joining groove 38 is realized but also a high embossing pressure is provided where the relatively thick groove 34 has to be formed.

While FIG. 4 gives a first example of a homogeneous pulp-core product with even thickness, FIG. 5 describes another example of such a pulp core product with a homogeneous core. This product is exemplified by sanitary napkin 33 having an uncompressed region 40 in the middle of the product. Such uncompressed region 40 creates a ridge. Starting from the uncompressed region 40, there is a plurality of grooves 44 which also have a varying depth. The depth of the grooves close to the uncompressed region is lower than the depths of the groove remote from the uncompressed region. By providing such grooves with increasing depths, liquid to be transported is directed away from the uncompressed region and into suitable target zones. In the example as shown in FIG. 5, four segments 14*a*, 14*b*, 14*c*, 14*d* could be used not forming part of the product as shown in FIG. 5 but denoted for illustrative purposes. The four segments 14*a*, 14*b*, 14*c*, 14*d* could be adjusted with regard to their individual angles in both main directions so that the depth of the grooves is less in the middle of the product. This means that the segments would be affixed to the core of an embossing roll such that they are close to the core in those corners of the individual segments which correspond to the uncompressed region 40 in the product and are adjusted such that the distance to the core of the embossing roll increases in both main directions with increasing distance from that corner corresponding to the uncompressed region.

The embossing tool can be provided with heating elements. Such heating can be of advantage for embossing because the material melts to some extent and some adhesion takes place.

The embodiment of FIG. 5 can also be based on a product having a uniform core thickness, whereas it is contemplated to provide grooves with a continuously varying depth.

Figure 3A:
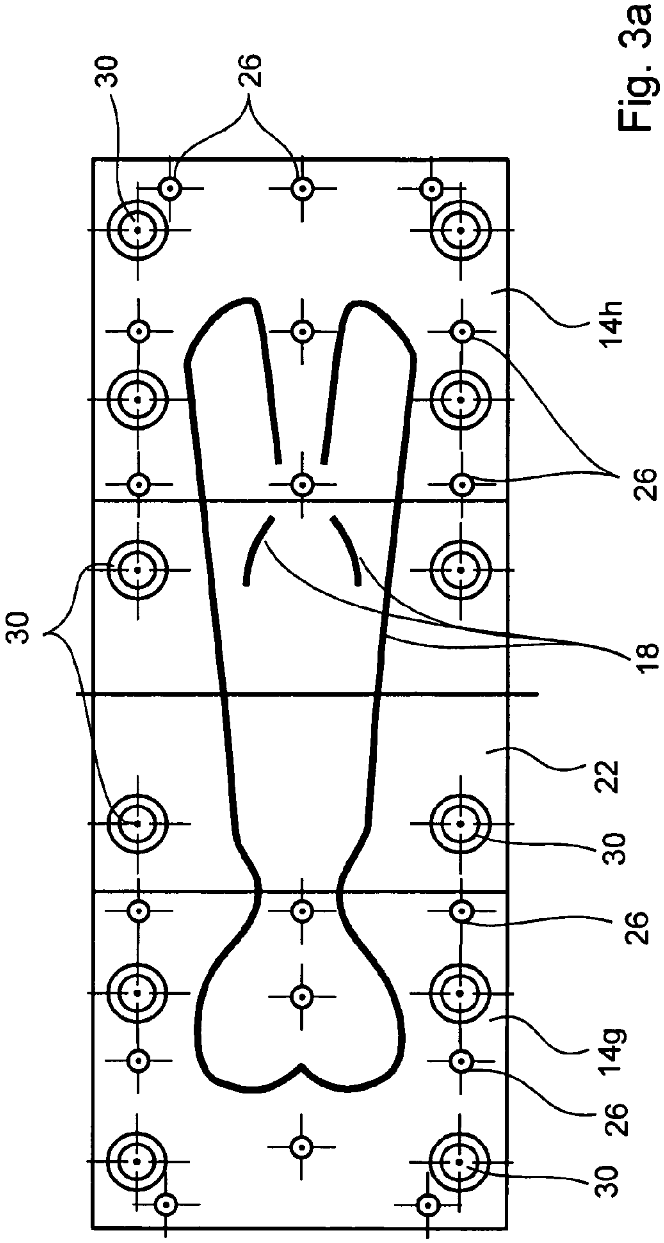
FIG. 3*a* shows a schematic view on the operative surface area of a rotary embossing roll in development, i.e. put into a plane.
Figure 3B:
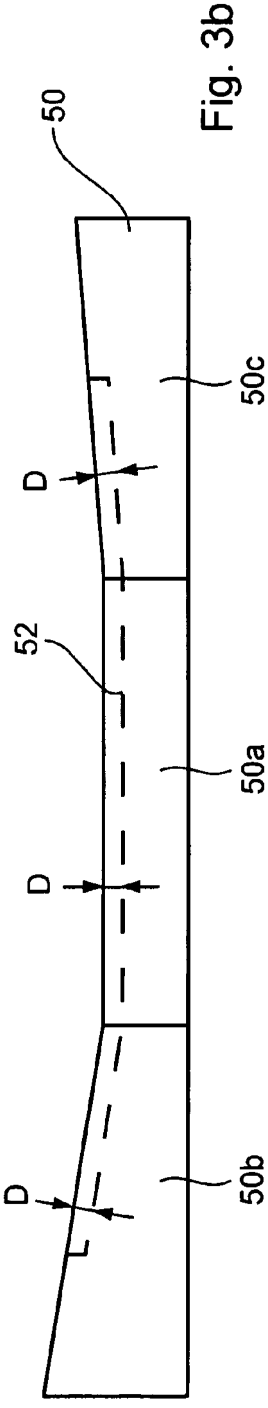
FIG. 3*b* schematically shows an embossed product in cross-sectional view.

Turning back to FIG. 3*a* and FIG. 3*b*, the embossing tool according to the invention can also be used to emboss a product 50 shown in cross-sectional view in FIG. 3*b*. Product 50 has a core with a varying thickness. There is a middle sector 50*a* with constant thickness, whereas end sectors 50*b* and 50*c* have a gradually increasing thickness. Such a product 50 could be produced by means of an operative surface of an embossing tool as shown in FIG. 3*a* with a fixed element 23 and two segments 14*g* and 14*h* in order to provide a groove 52 with uniform thickness over the product. In order to achieve this, segments 14*g* and 14*h* as shown in FIG. 3*a* have to be angularly adjusted relative to fixed element 22 so as to form a smooth transition with fixed element 22 and to account for the increasing thickness of the end regions of the pulp-core to be embossed. If a proper angular adjustment of the segments relative to the local circumferential direction of the core of the embossing roll is provided, it is possible to emboss groove 52 with uniform depth D in the profiled core of product 50.

The correct orientation of individual segments can be selected by simple try-and-error methods also taking into account the visual appearance of the resulting product. Nevertheless, it is also possible to measure specific characteristic data of sample products like sample surface weight and groove density.

Groove thickness is determined as the distance between an anvil or base surface and a pressure foot used to apply a specified pressure. This can be easily carried out in a climatically controlled laboratory (controlled temperature and relatively humidity) and using a measurement device like Mitutoyo Instruments (Japan) model ID U1025 which has a accuracy of +/−0.02 mm).

The thickness of the product in the groove area is measured using a precision digital measurement device with a flat bottomed rectangular pressure foot with a length of 10 mm and a width of 1 mm. The pressure foot is lowered towards a base of a groove with the pressure foot exerting a pressure of 96 kPa towards the base corresponding to a mass of 97.8 g. When measuring at least 10 products, an average value can be calculated on a plurality of positions of the groove.

The basis weight of a product can be easily calculated by punching out pieces of a well defined surface area and determining its mass using a laboratory scale (+/−0.0005 g). From the groove thickness and the basis weight, the density of the groove can be estimated.

In order to properly adjust the segments to the core of embossing roll, the target to be optimized could be the surface weight index and the groove density index.

The surface weight index is defined as the largest increase in the average surface weight between two adjacent parts (front and middle or middle and back of a sample product).

The groove density index is defined as the largest increase in the average groove density between two adjacent parts of the sample product.

In the above described embodiments, the adjustment of the segments was only carried out in order to adapt to the specific needs of the product to be embossed. However, such adjustment could also serve to compensate for a deflection of the whole treatment unit. Such deflection is influenced by the nip contact area between the product and the embossing roll, the elasticity of the unit consisting of the embossing roll and an anvil roll and the hardness of the product if this property should change within one product. If the nip contact area in an embossing unit increases, there is more material squeezed in the nip between the embossing roll and the anvil roll. Consequently, the force increases which gives rise to a deflection of the overall embossing unit. Only if the embossing tool was totally stiff without any elasticity, a unit deflection would not occur. Therefore, it is not possible to fully exclude a certain degree of unit deflection which widens the gap between an embossing roll and an anvil roll. This is another reason why the final product quality is best realized by starting from a basic adjustment position of the segments which follows the height profile of the core to be embossed, followed by a fine adjustment accounting for density differences and compensating for deflection effects in the embossing unit.

By the help of the adjustable embossing tool according the invention, it is possible to provide a different compression or density on different parts of a product. This general technology can be used on all kinds of products, like fluff and non-fluff products. When the product design is changed, the embossing tool also provides for a high variability to adjust to other types of products with low investment costs and even low changeover times. Besides a better aesthetic appearance of products with profiled cores, also products with a homogeneous pulp core of even thickness can be improved because it is easily possible to form embossing grooves which move moisture or body liquids with high speed to a desired target zone of the product, e.g. a low density zone of the product.

The invention claimed is:

1. An embossing tool, comprising:

a rotary embossing roll with an axis of rotation in its longitudinal direction and raised embossing protrusions arranged on an operative surface area of the embossing roll;

the embossing roll comprising a least two segments forming at least a part of the operative surface area of the embossing roll; and each segment being provided with at least one of the raised embossing protrusions; and at least one segment includes at least two spaced apart, independently provided adjustment devices for adjusting the radial position and angular orientation of the at least one segment into one of a plurality of radial positions and angular orientations and securing the at least one segment in the one adjusted radial position and angular orientation.

2. The embossing tool according to claim 1, wherein the at least two segments are positioned next to each other in the longitudinal direction of the embossing roll.

3. The embossing tool according to claim 1, wherein the at least two segments are positioned next to each other in a circumferential direction of the embossing roll.

4. The embossing tool according to claim 1, further comprising:

means for fixing the segments to a core element of the embossing roll.

5. The embossing tool according to claim 1, wherein the adjustment devices are screws.

6. The embossing tool according to claim 1, wherein the adjustment devices provide for a maximum variation in the radial extension of 0.8 mm.

7. The embossing tool according to claim 1, wherein the angular tilting of a segment relative to the longitudinal direction and/or circumferential direction is a maximum of 45 degrees.

8. The embossing tool according to claim 1, wherein at least one of the embossing protrusions of a segment has a gradually varying thickness.

9. The embossing tool according to claim 1, comprising:

an anvil roll cooperating with the embossing roll, the operative surface of the anvil roll being covered with a yielding material.

10. The embossing tool according to claim 5, wherein the screws are self-locking screws.

11. The embossing tool according to claim 6, wherein the adjustment devices provide for a maximum variation in the radial extension of 0.5 mm.

12. The embossing tool according to claim 1, wherein at least one of the embossing protrusions of a segment has a stepwise varying height.

13. The embossing tool according to claim 2, wherein at least one of the embossing protrusions of a segment has a stepwise varying height.

14. The embossing tool according to claim 2, wherein at least one of the embossing protrusions of a segment has a gradually varying height.

* * * * *